Jan. 11, 1972  K. D. RICHMOND ET AL  3,634,572
TRANSMISSION BELT AND APPARATUS FOR AND METHOD OF MAKING SAME
Filed Dec. 23, 1968  2 Sheets-Sheet 1
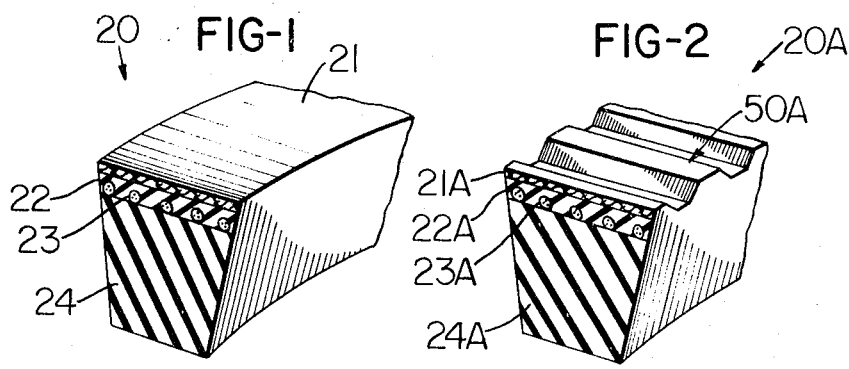
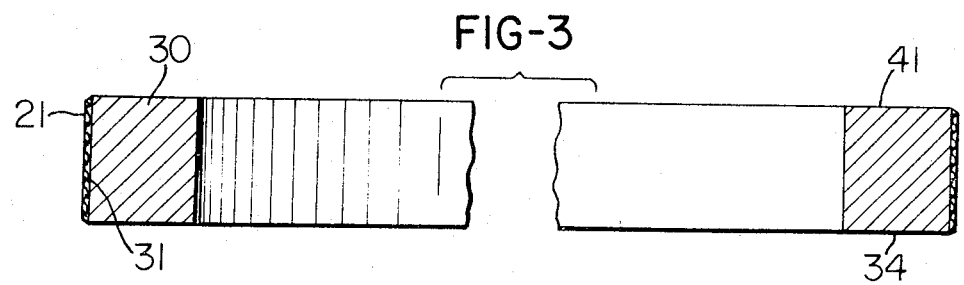
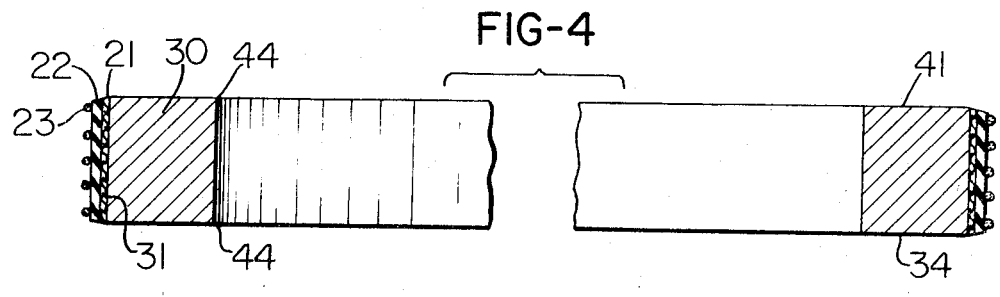
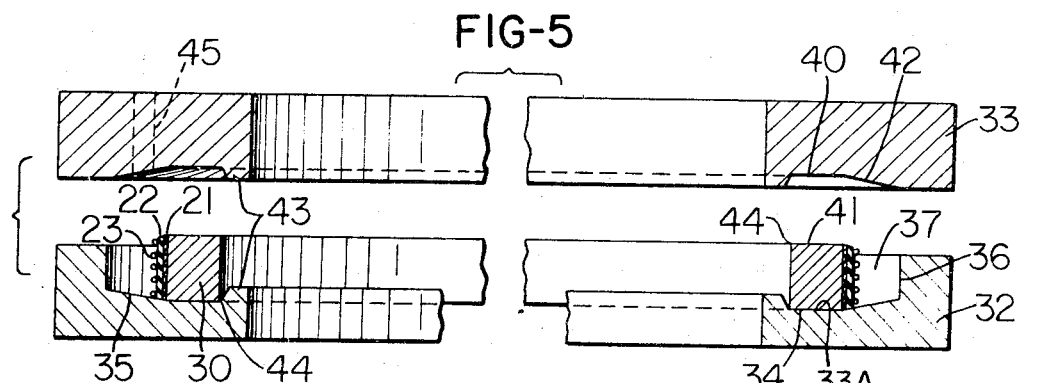
INVENTORS
KENNETH D. RICHMOND
HOWARD J. JENSEN
BY
Reuben Wolk
ATTORNEY

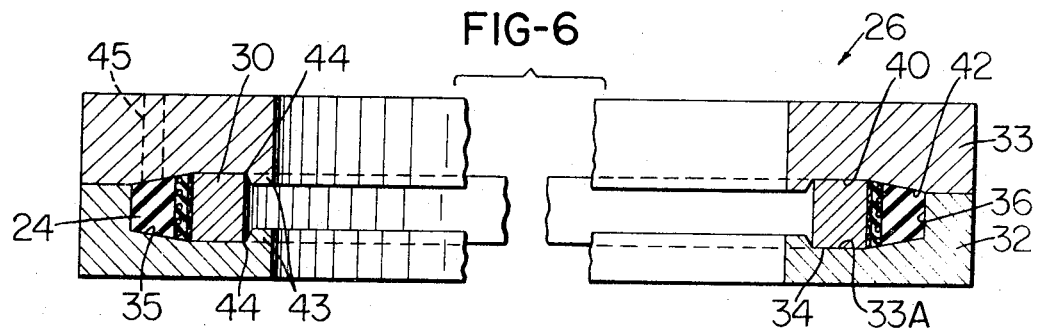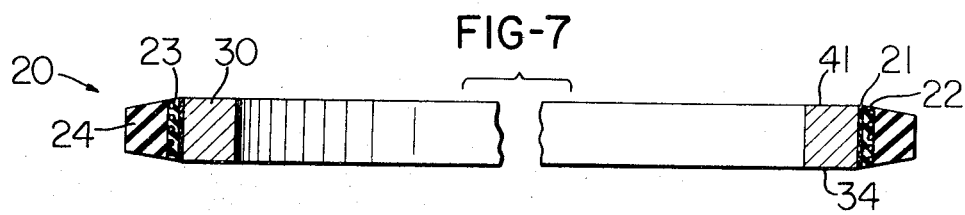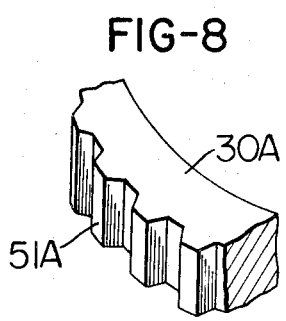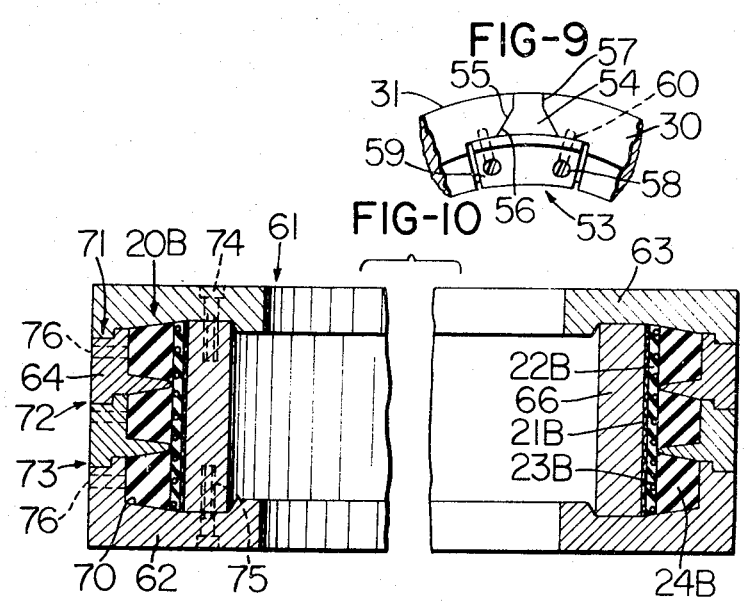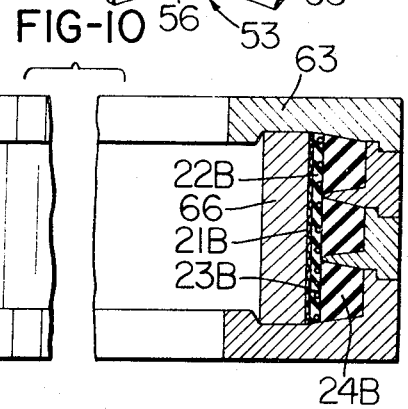

United States Patent Office 3,634,572
Patented Jan. 11, 1972

3,634,572
TRANSMISSION BELT AND APPARATUS FOR AND METHOD OF MAKING SAME
Kenneth D. Richmond, Nixa, and Howard J. Jensen, Springfield, Mo., assignors to Dayco Corporation, Dayton, Ohio
Filed Dec. 23, 1968, Ser. No. 786,229
Int. Cl. B29d 29/02; B29h 7/22
U.S. Cl. 264—159
4 Claims

ABSTRACT OF THE DISCLOSURE

A method of making an endless power transmission belt having an accurately controlled length and having integral injection molded compression section means is disclosed wherein such belt is made in an inverted position and is ready for use upon being turned inside out.

BACKGROUND OF THE INVENTION

Present injection molded endless power transmission belts are molded in their normal positions and require complicated apparatus and time consuming operations and/or cooling procedures to assure the provision of acceptable belts.

SUMMARY

This invention provides an improved method of making an endless power transmission belt having an accurately controlled length and having integral injection molded compression section means wherein such belt is built in an inverted position and turned inside out for use.

Other details, uses, and advantages of this invention will become apparent as the following description of the exemplary embodiments thereof presented in the accompanying drawings proceeds.

BRIEF DESCRIPTION OF THE DRAWINGS

The accompanying drawings show present exemplary embodiments of this invention, in which FIG. 1 is a fragmentary perspective view with parts in cross section illustrating one exemplary embodiment of an endless power transmission belt of this invention;

FIG. 2 is a fragmentary perspective view similar to FIG. 1 illustrating another exemplary embodiment of an endless power transmission belt of this invention;

FIG. 3 is a view with parts in cross section and parts broken away of a central ring-like supporting mandrel comprising one exemple of the apparatus of this invention used to make the transmission belt of FIG. 1 and particularly illustrating cover means for such belt wrapped concentrically around outer annular surface means of such ring-like mandrel;

FIG. 4 is a view similar to FIG. 3 and particularly illustrating a gum material wrapped outwardly of and against the cover means as shown in FIG. 3 and load-carrying cord wrapped against the gum material in a spiral manner;

FIG. 5 is a view with parts in cross section and parts broken away particularly illustrating die means in the form of a pair of cooperating die members which are shown apart and are adapted to be fixed in position against opposite sides of the ring-like mandrel so that opposed surfaces of the cooperating die members and outer annular surface means of the ring-like mandrel cooperate to define cavity means for receiving and curing an elastomer which defines compression section means for an associated transmission belt to be formed by the apparatus of FIG. 5;

FIG. 6 is a view of the apparatus of FIG. 5 illustrating the die members held in position against opposite sides of the central ring-like mandrel and particularly illustrating the elastomer injected in position within the cavity means provided in the apparatus;

FIG. 7 is a view illustrating the cooperating bottom and top die members of the apparatus of FIG. 6 removed and illustrating the ring-like mandrel carrying a molded and cured transmission belt;

FIG. 8 is a fragmentary perspective view with a portion in cross section particularly illustrating another exemplary embodiment of a ring-like mandrel which may be utilized with the cooperating bottom and top die members of FIG. 6 to define the transmission belt of FIG. 2;

FIG. 9 is a fragmentary perspective view particularly illustrating expanding means in the form of a wedge-like insert which may be utilized to expand the ring-like mandrel of FIG. 3 after wrapping the load-carrying means in position to thereby pre-load such load-carrying means;

FIG. 10 is a view with parts in cross section and parts broken away illustrating another exemplary embodiment of the apparatus of this invention which may be utilized to define a belt construction having a plurality of V-belt elements;

FIG. 11 is a fragmentary view with parts in cross section particularly illustrating the multiple element belt construction of FIG. 10 in its inverted position over a supporting spindle and illustrating fragmentary portions of a pair of cutter blades which may be utilized to cut the belt construction and define a plurality of individual V-belts; and FIG. 12 is a cross-sectional view illustrating another exemplary power transmission belt of this invention supported in an inverted position by its ring-like mandrel.

DESCRIPTION OF ILLUSTRATED EMBODIMENTS

Reference is now made to FIG. 1 of the drawings which illustrates one exemplary embodiment of an endless power transmission belt 20 of this invention which has outer cover means which may be in the form of a fabric cover 21 suitably impregnated with a rubber-like material, a tension section 22 adjoining the cover 21 and defined by a rubber-like material commonly referred to as a gum material and having high resiliency, load-carrying means in the form of a spirally wound load-carrying cord 23, and an injection molded compression section means shown in this example as a compression section 24 of trapezoidal cross-sectional configuration. The load-carrying means 23 is described as being a continuous spirally wound cord; however, it will be appreciated that such load-carrying means may be comprised of any suitable construction. Further, the cord 23 may be defined as a single strand or a plurality of plain or suitably twisted strands and may be made of any suitable material including materials which may have thermal shrinkage characteristics such as nylon, polyesters, and the like.

The belt 20 is built up in an inverted position and is then turned inside out to enable such belt to be used in the normal manner. The compression section 24 is formed last in the build-up sequence by injection molding utilizing the apparatus and method of this invention. The compression section 24 may be formed of any suitable material such as a natural rubber compound, a synthetic rubber compound, or urethane, for example; and the compression section 24 may be made with fiber reinforcement.

The exemplary power transmission belt 20 may be formed utilizing the apparatus 26 illustrated in FIG. 6 and such apparatus is used to form such belt in an inverted position. The apparatus 26 comprises a central ring-like mandrel 30 of comparatively small mass and having outer annular surface means 31 of right circular cylindrical configuration. The apparatus 26 also comprises die means in the form of a pair of cooperating die members shown as a bottom die member 32 and a top die member 33.

As best seen in FIGS. 5 and 6 the bottom die member is in the form of an annular member having an annular surface 33A which engages the bottom annular surface 34 of the mandrel 30, an inclined surface 35 extending outwardly from the outer edge of surface 33A, and a surface 36 which extends vertically upwardly from the terminal edge of surface 35. The top die member 33 has an annular surface 40 which is similar to the surface 33A and engages the top annular surface 41 of the mandrel 30, and an inclined annular surface 42 extending outwardly from the terminal outer edge of the surface 40. The members 32 and 33 are adapted to be assembled together against opposed surfaces 34 and 41 respectively of the ring-like mandrel 30 so as to define cavity means in the form of a substantially toroidal cavity 37 of trapezoidal cross-sectional configuration.

Each member 32 and 33 of this example of the invention has an annular projection 43 which is adapted to engage an associated inside corner 44 of the central ring-like mandrel to hold the ring-like mandrel 30 in position against movement relative to members 32 and 33 upon fastening the members 30, 32 and 33 together. The members 30, 32 and 33 may be fastened together using any suitable means such as threaded fastening bolts extending through openings in each member 32 and 33 and being threaded into cooperating threaded openings provided in the member 30; however, the members 32 and 33 may be held together by suitable fastening means acting between only the members 32 and 33.

The belt 20 is formed in a simple and economical manner using injection molding techniques whereby a suitable elastomer is used to define the compression section 24. The elastomer may be introduced into the mold cavity 37 utilizing one or more passages which may extend through either or both of the members 32 and 33 and such passages may be arranged to extend either substantially parallel to or transverse the central axis of the ring-like mandrel 30 with the apparatus 26 in assembled relation. For simplicity, a single exemplary opening means 45 for introducing the elastomer into the mold cavity 37 is provided in the upper member 33 and drawn by dotted lines.

Having described the component portions of the belt 20 and the apparatus 26 which may be utilized to make such belt, the detailed description will now proceed with a description of the simplicity with which the belt 20 may be made in an inverted manner and so that the completed belt has a known accurately controlled length.

The belt 20 is made by wrapping cover means such as a fabric material 21 tightly against the annular surface 31 of the mandrel 30, see FIG. 3. A highly resilient rubber-like gum material, also designated by the reference numeral 22 prior to partially melting and bonding such material in position to define the tension section 22, is wrapped concentrically outwardly of and against the fabric cover material 21 as will be apparent from FIG. 4. A load-carrying cord 23 is spirally wrapped against and outwardly of the resilient gum material 22 and hence outwardly of the annular surface means 31 of the mandrel 30. The build-up of belt sections as shown in FIG. 4 is presented merely by way of example; however, it is to be understood that any desired volume, construction, or arrangement of cover means 21, load-carrying means 23, or gum material 22 may be provided for a given belt construction. For example, the gum material 22 may be wrapped outwardly of the cord material 23, if desired.

After building up the belt as shown in FIG. 4, the die members 32 and 33 are arranged concentrically outwardly of the load-carrying means 23 for the belt 20 and the supporting mandrel 30 to define the mold cavity 37 with the component portions 21, 22 and 23 of the belt 20 being positioned within the mold cavity 37 whereupon the members 30, 32 and 33 are suitably fastened together. An elastomer is injected into the cavity 37 through the opening means 45 in the member 33 to define the integral compression section 24 of the belt 20. As previously suggested, the elastomer used may be in the form of a natural rubber compound, a synthetic rubber compound, or urethane.

The elastomer is injected into the mold cavity 37 under controlled conditions so that upon solidification thereof the component portions 21–23 are bonded together as a unitary construction and define the corresponding cover 21, tension section 22, and neutral axis member or load-carrying cord 23 of the belt 20 while simultaneously defining the integral compression section 24 for such belt. The elastomer may be injected into the mold cavity at elevated temperatures and pressures and is then suitably cured using known techniques.

From the above description it is seen that the belt 20 is formed and cured in an inverted position. After curing, the die members 32 and 33 are moved away from the mandrel 30 and the hot belt 20 is still supported by the mandrel 30, see FIG. 7. As previously mentioned, the mandrel 30 has a comparatively small mass and the cured belt 20 and its mandrel 30 may be rapidly cooled with the mandrel supporting belt 20 against shrinkage during the cooling action whereby the completed cooled belt has a predetermined accurately controlled length which is determined by the configuration of the rigid mandrel 30. The cooled belt 20 is ready for use once such belt is removed from the mandrel and turned inside out.

Any suitable technique may be used to cool the belt 20 such as by immersing the belt and its mandrel 30 in water. Further, with the hot belt supported on the ring-like mandrel 30 it is easy to handle. It will also be appreciated that a plurality of mandrels 30, as well as associated die means, may be utilized so that certain members may be cooling while others are being prepared and injected.

Another exemplary embodiment of a transmission belt of this invention is illustrated in FIG. 2 of the drawings. The belt of FIG. 2 is very similar to the belt 20; therefore, such belt will be designated generally by the reference numeral 20A and parts of the belt 20A which are very similar to corresponding parts of the belt 20 will be designated by the same numeral as in the belt 20 also followed by the letter designation A and not described again. The only difference between the belt 20A and the belt 20 is that the outer portion of the belt 20A and hence its fabric cover 21A has a toothed or undulating configuration which is designated generally by the reference numeral 50A.

The belt 20A with its toothed or undulating outer configuration 50A is defined by a ring-like mandrel 30A, see FIG. 8, which has a toothed configuration 51A defining its outer surface. The ring 30A may be substituted for the ring 30 in the apparatus 26 to define the belt 20A. In addition, the belt 20A may be built up in a similar manner as the belt 20 and it will be appreciated that during the injection molding of belt 20A its cover means and adjoining portions are forced to follow the contour of the surface 51A.

If desired, the belt 20 may have its load-carrying means or cord 23 preloaded and in this example of the invention suitable means in the form of expanding means 53 may be provided for preloading the cord 23, see FIG. 9. However, it is to be understood that the mandrel 30 may be a continuous ring which is not provided with expanding means.

The expanding means 53 may be of any suitable construction and in this example comprises a wedge-like insert 54 which has inclined surfaces 55 adapted to engage cooperating inclined surfaces 56 which may be provided in the ring-like mandrel 30. The construction of the mandrel 30 may be such that it has a roughly circular configuration which becomes a substantially perfect circle upon wedging the insert 54 in position. In addition, the mandrel 30 may be constructed so that its end edges 57 are normally resiliently held against each other.

The insert 54 may be held in position by a pair of cooperating threaded bolts 58 which are extended through associated openings provided in outwardly extending legs 59 of the insert 54 and each bolt 58 is threaded within an associated threaded opening 60 in the ring-like mandrel 30. The wedge-like insert 54 enables the circumferential length of the outer annular surface 31 of the ring-like mandrel 30 to be extended or increased to thereby enable preloading of the load-carrying cord 23 once the cord 23 has been wrapped in position. The size of a particular insert 54 is determined by the amount that a particular ring-like mandrel 30 is to be expanded and the character of the particular load-carrying means 23. It will also be appreciated that a plurality of wedge-like inserts similar to insert 54 may be utilized for expanding purposes whereby the associated ring-like mandrel would be comprised of a corresponding plurality of cooperating sections.

Another exemplary embodiment of an endless power transmission belt construction and apparatus for making same in an inverted manner is illustrated in FIG. 10 of the drawings. The belt construction of FIG. 10 will be designated generally by the reference numeral 20B and the component portions thereof which are similar to corresponding component portions of the transmission belt 20 will be designated by the same reference numeral as in the belt 20 also followed by the letter designation B and not described again in detail.

The main differences between the transmission belt 20B and the transmission belt 20 are that the transmission belt 20B has a comparatively wide cover 21B and a tension section 22B of corresponding width with load-carrying means defined by a spirally wound core 23B. Compression section means of the belt 20B is comprised of a plurality of adjoining compression sections each defining a V-belt element 24B.

The exemplary transmission belt 20B is defined by an apparatus 61 and comprised of a bottom die member 62, a top die member 63, and intermediate annular die means in the form of a plurality of identical interlocking intermediate member 64. The members 62, 63 and 64 cooperate with a central ring-like mandrel 66 to define cavity means in the form of a plurality of annular cavities 70 each adapted to receive a elastomer therewithin to define an associated V-belt element 24B.

The members 62, 63 and 64 have cooperating interlocking projections indicated at 71, 72 and 73 which enable such members to be interlocked together to define the previously mentioned cavities 70. Further, fastening means in the form of a plurality of fastening bolts 74 may be provided with each bolt 74 extending through an associated opening in the bottom member 62 or top member 63 and into threaded engagement with an associated threaded opening 75 in the annular rig-like mandrel 66, whereby the interlocking projections of members 62-64 and bolts 74 enable the apparatus 61 to be held together in a simple and efficient manner.

The technique used to build up the belt 20 on its mandrel 30 is fully applicable in making the transmission belt 20B wherein portions 21B, 22B, and 23B are built up on mandrel 66. Also, each compression section portion 24B of belt 20B is defined by suitably injecting an elastomer in an associated cavity 70 through passage means 76 in each intermediate member 64 and in the lower member 62. The belt construction 20B may then be suitably cooled together with the entire apparatus 61 or with only member 66 in position after removal of members 62, 63 and 64.

The belt construction 20B may be used essentially as a single belt having a plurality of integral V-belt elements of trapezoidal cross-sectional configuration. However, as seen in FIG. 11, the belt construction 20B may be placed over a spindle 80 and a plurality of knife means such as cutting edges 81 may be suitably positioned and moved radially inwardly toward the center of the spindle 80 during relative rotation of the belt construction 20B and the knife edges 81 whereby the inverted belt construction 20B may be effectively severed to define a plurality of V-belts each being substantially identical (upon being turned inside out) to the V-belt 20 illustrated in FIG. 1.

An apparatus similar to the apparatus 61 illustrated in FIG. 10 may be utilized to define the transmission belt 20C illustrated in cross-sectional view in FIG. 12 of the drawings. The belt construction of FIG. 12 comprises an outer cover 21C, a tension section 22C, load-carrying means 23C, and compression section means comprised of a plurality of integral members 24C each having a triangular cross-sectional configuration. The belt 20C is built up against an associated ring-like mandrel 66M which is similar to mandrel 66 of the apparatus 61. Further, the belt 20C is also cooled with the mandrel 66M in position to assure such belt also has an accurately controlled cooled length.

Thus, it is seen that this invention provides an accurately controlled endless power transmission belt and an apparaus for and method of making same wherein such belt is made in an inverted position and turned inside out for use.

While present exemplary embodiments of this invention, and methods of practicing the same, have been illustrated and described, it will be recognized that this invention may be otherwise variously embodied and practiced within the scope of the following claims.

What is claimed is:

1. A method of making an endless power transmission belt having an accurately controlled length, said method comprising the steps of, forming load-carrying means comprising said belt concentrically around a central ring-like supporting mandrel having a comparatively small mass, said mandrel having a cylindrical outside surface of fixed circumferential length which defines said controlled length and serving as a build-up mandrel, placing die means circumferentially outwardly of said load-carrying means and said mandrel to define mold cavity means adjacent said load-carrying means, injecting an elastomer into said mold cavity means against said load-carrying means and curing said elastomer to define integral compression section means for said belt, removing said die means leaving only the cured belt on its supporting ring-like mandrel, cooling said belt and mandrel as a unit with optimum efficiency due to the comparatively small mass of said ring-like mandrel, said belt being precisely held to its cured length until cooled with said cured length being controlled by said fixed circumferential length, and separating the cooled belt and mandrel, said belt being formed in an inverted position and being easily turned inside out for use upon separation thereof from said mandrel.

2. A method as set forth in claim 1 in which said cooling step comprises immersing said cured belt and ring-like mandrel in cooling water.

3. A method as set forth in claim 1 in which said placing step comprises placing die means defining mold cavity means in the form of a plurality of spaced annular cavities each arranged adjacent said load-carrying means, said plurality of annular cavities defining corresponding number of integral V-belt elements, and said separating step comprises separating the completed multiple element belt from said die means and said mandrel.

4. A method as set forth in claim 3 and comprising the further step of cutting said multiple element belt so that each element and its adjoining annular portion define a single V-belt which is ready for use upon being turned inside out.

References Cited

UNITED STATES PATENTS

| | | | |
|---|---|---|---|
| 2,456,580 | 12/1948 | Carter | 264—229 |
| 3,079,642 | 3/1963 | Needham | 264—X |
| 3,114,598 | 12/1963 | Beckadolph | 264—275 X |
| 3,200,180 | 8/1965 | Russ | 264—X |
| 3,293,345 | 12/1966 | Zebrowski | 264—348 X |
| 3,470,289 | 9/1969 | Katsuki | 264—229 |
| 3,477,895 | 11/1969 | Sauer | 264—231 X |
| 2,305,433 | 9/1940 | Kyle | 264—348 X |

FOREIGN PATENTS

| | | | |
|---|---|---|---|
| 387,871 | 1963 | Japan | 264—229 |

ROBERT F. WHITE, Primary Examiner

R. R. KUCIA, Assistant Examiner

U.S. Cl. X.R.

264—229, 231, 328

UNITED STATES PATENT OFFICE
CERTIFICATE OF CORRECTION

PO-1050
(5/69)

Patent No. 3,634,572              Dated  January 11, 1972

Inventor(s) Kenneth D. Richmond and Howard J. Jensen

It is certified that error appears in the above-identified patent and that said Letters Patent are hereby corrected as shown below:

Column 1, line 43, "exemple" should read --- example ---

50, after "and" should be inserted --- a ---

Column 5, line 47, "core" should read --- cord ---

55, "member 64" should read --- members 64 ---

68, "rig-like" should read --- ring-like ---

Claim 3, line 5, before "corresponding" should be inserted --- a ---

Signed and sealed this 3rd day of October 1972.

(SEAL)
Attest:

EDWARD M. FLETCHER, JR.
Attesting Officer

ROBERT GOTTSCHALK
Commissioner of Patents